United States Patent

[11] 3,628,029

| [72] | Inventor | David R. Tompkins |
| | | Houston, Tex. |
| [21] | Appl. No. | 744,861 |
| [22] | Filed | July 15, 1968 |
| [45] | Patented | Dec. 14, 1971 |
| [73] | Assignee | Schlumberger Technology Corporation |
| | | New York, N.Y. |
| | | Continuation-in-part of application Ser. No. 587,138, Oct. 17, 1966, now abandoned. This application July 15, 1968, Ser. No. 744,861 |

[54] APPARATUS FOR INSPECTING TUBULAR GOODS
7 Claims, 8 Drawing Figs.

[52] U.S. Cl. .................................................. 250/83.3 D, 250/105
[51] Int. Cl. ................................................................ G01t 1/16
[50] Field of Search .......................................... 250/833 D, 105

[56] References Cited
UNITED STATES PATENTS

| 2,964,630 | 12/1960 | Bosch | 250/83.3 |
| 3,066,254 | 11/1962 | Price et al. | 250/83.3 X |
| 3,128,380 | 4/1964 | Nirschl | 250/105 X |
| 3,178,576 | 4/1965 | Arvanetakis | 250/83.3 |
| 3,373,286 | 3/1968 | Han | 250/105 |
| 2,638,554 | 5/1953 | Bartow et al. | 350/96 X |
| 2,677,069 | 4/1954 | Bachman | 250/105 X |

FOREIGN PATENTS

| 285,738 | 2/1928 | England | 350/96 |

Primary Examiner—James W. Lawrence
Assistant Examiner—Davis L. Willis
Attorneys—Ernest R. Archambeau, Jr., John P. Sinnott, David L. Moseley, Edward M. Roney, William R. Sherman and Stewart F. Moore ABSTRACT: In the representative embodiment of the invention disclosed herein for measuring the wall thickness of elongated tubular goods being axially translated along a selected inspection axis, a radiation detector coaxially positioned within a moving tubular member provides a characteristic signal in response to a sharply focused beam of radiation that is progressively swept around the tubular member and continuously intersects the detector. To obtain this clearly defined radiation pattern, a radioactive source that is rotated outside of the tubular member in a circular path around the inspection axis is disposed adjacent to the outer ends of two or more focusing slots that converge toward the inspection axis. As a result, this sharply defined radiation pattern is substantially smaller than the active portion of the detector so that random or erratic movements of the detector within the moving tubular member will not affect the measurements obtained.

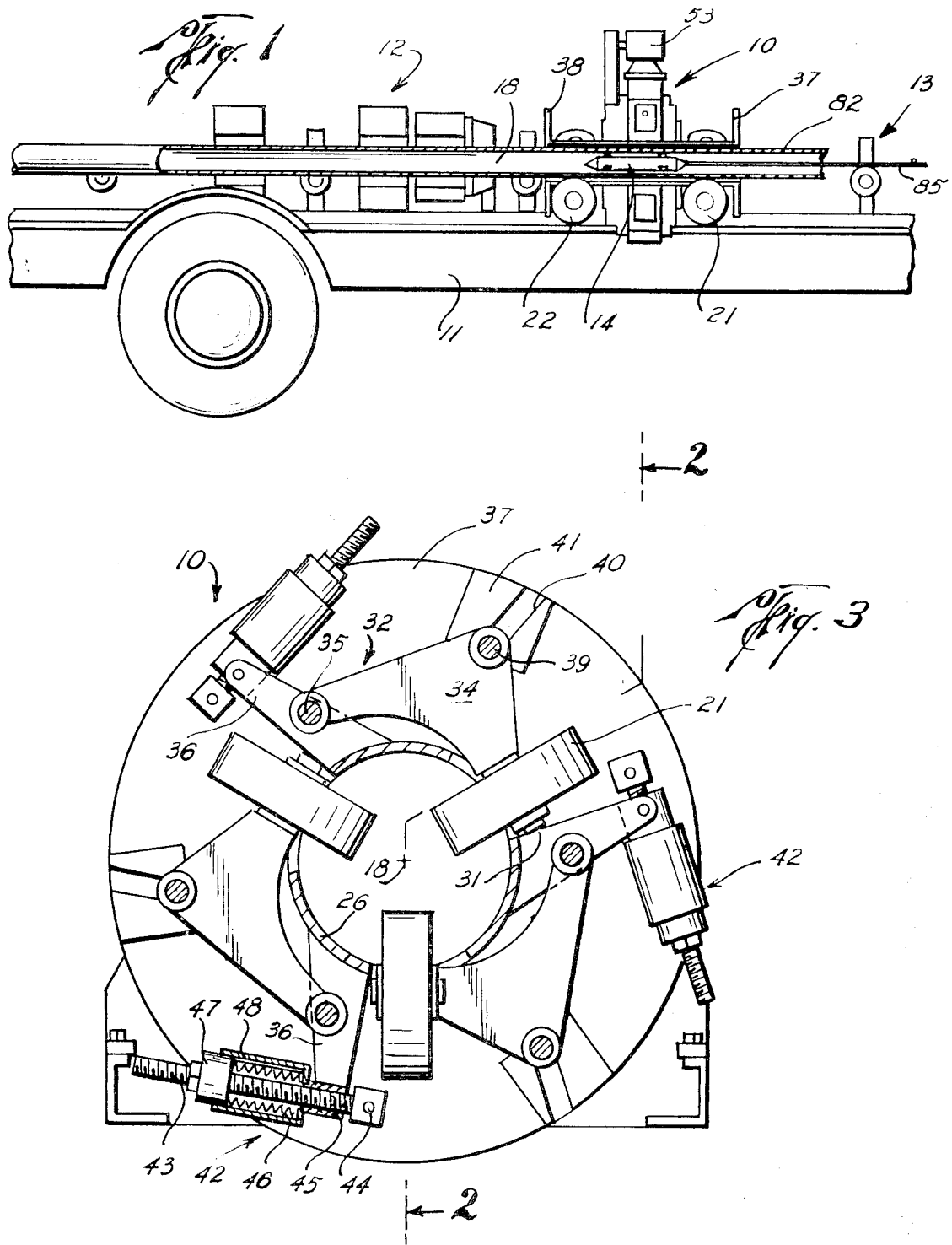

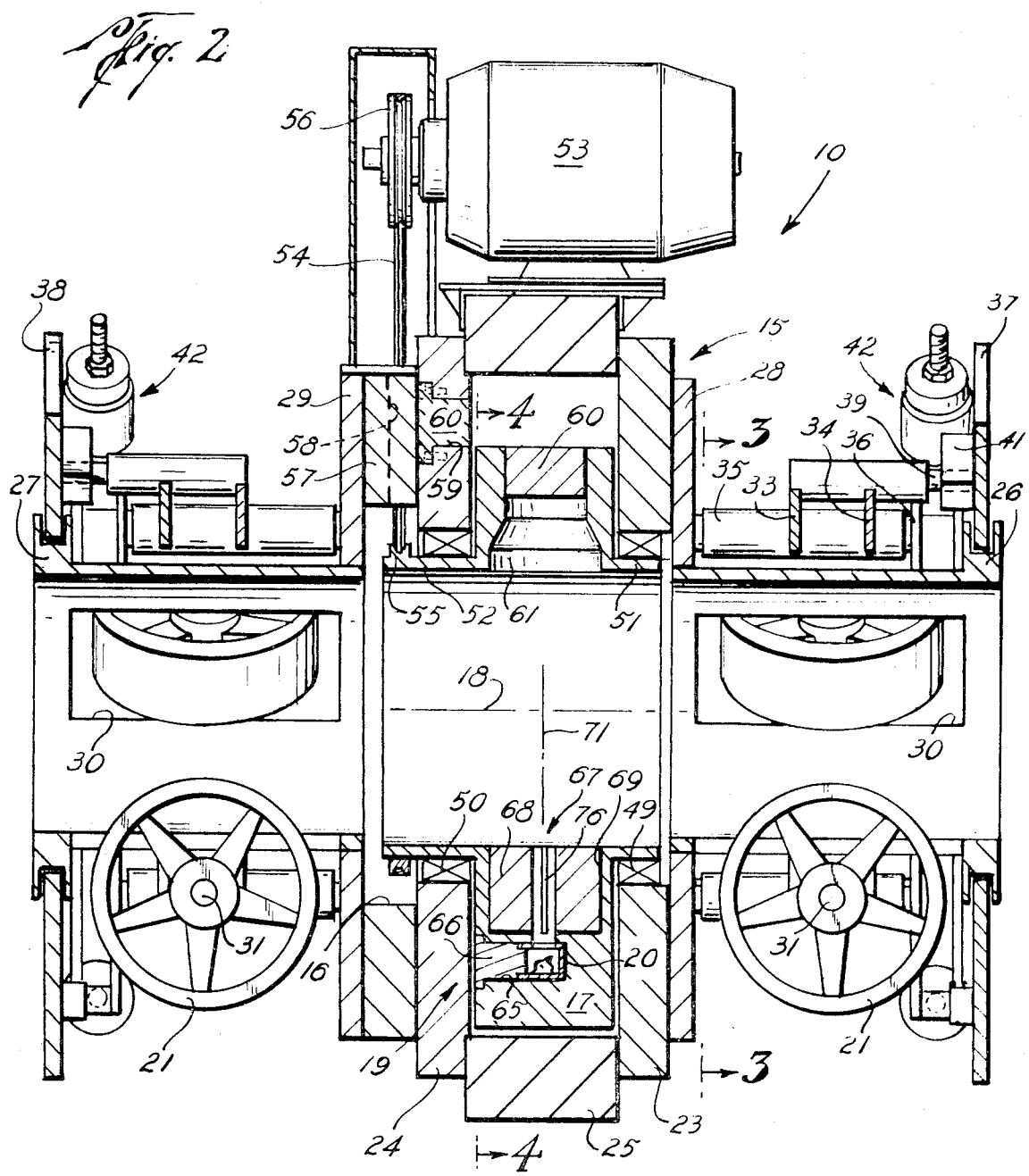

Patented Dec. 14, 1971
3,628,029
4 Sheets-Sheet 3
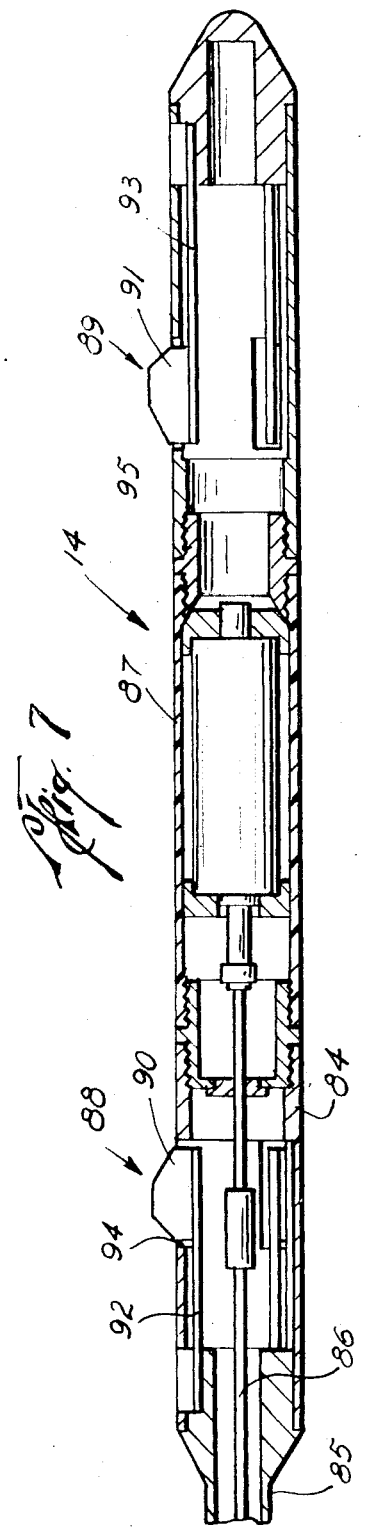
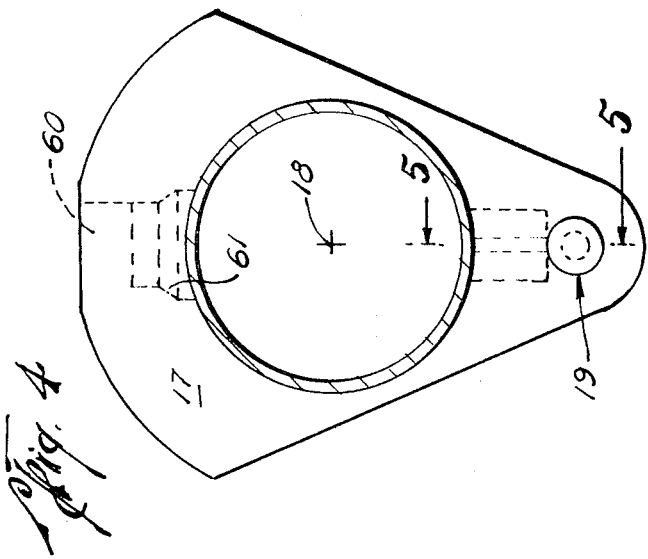
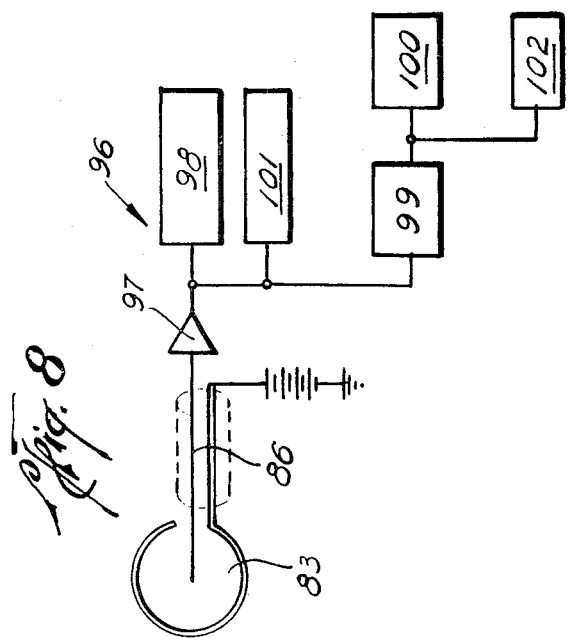
David R. Tompkins
INVENTOR.
BY
J. K. Archambeau Jr.
John P. Sinnott
ATTORNEYS

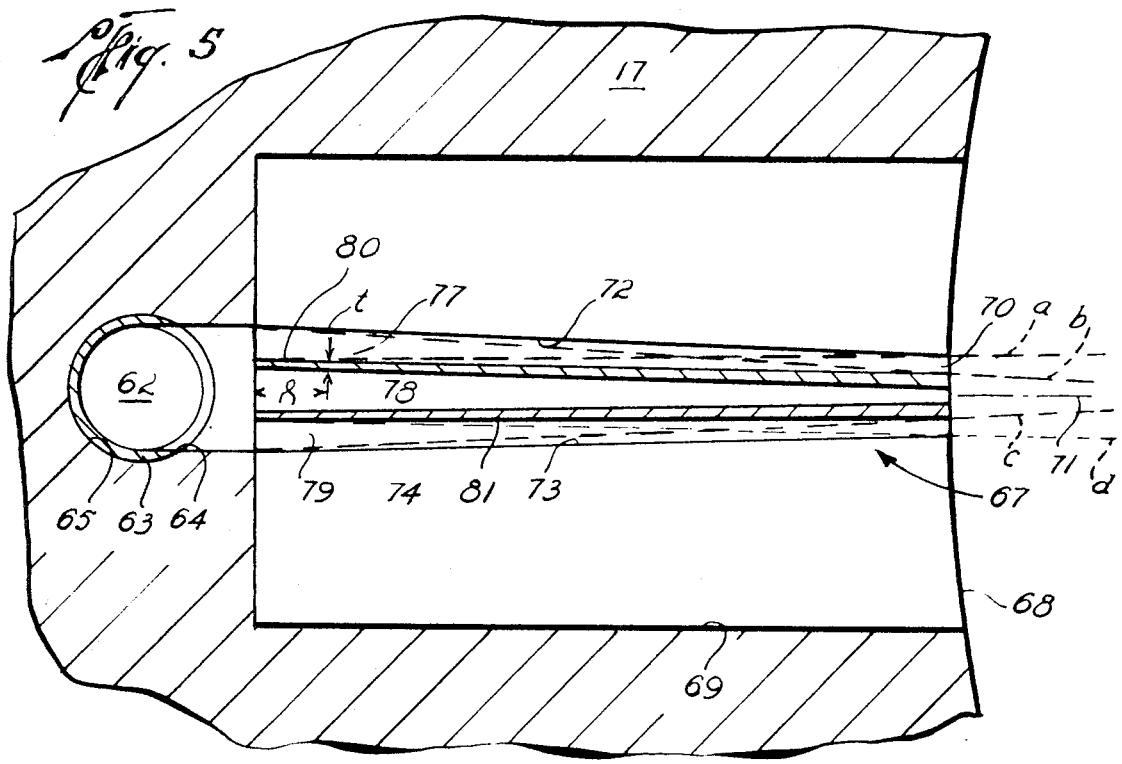
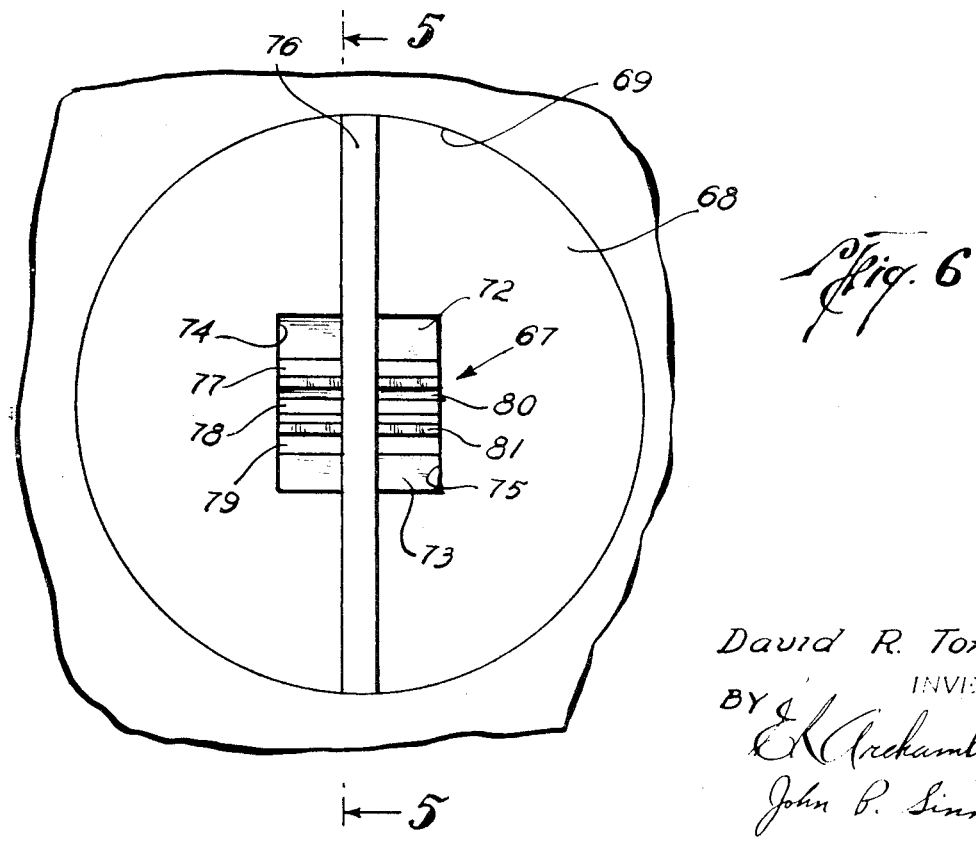

APPARATUS FOR INSPECTING TUBULAR GOODS

This application is a continuation-in-part of U.S. application Ser. No. 587,138, filed Oct. 17, 1966 now abandoned.

Elongated tubular goods, such as oilfield piping or tubing and the like, are frequently inspected for hidden flaws and other latent defects that might cause failure of such tubular members while in service. As one aspect of such inspections, it is often desired to also obtain representative measurements of the wall thicknesses of such tubular members at spaced points along their length. It will be recognized, of course, that such thickness measurements must be obtained at several points around the circumference of a pipe as well as along its entire length to be certain of detecting minute imperfections.

Various thickness-measuring devices have, of course, been devised heretofore for inspecting long lengths of pipe and tubing. Devices of this nature typically employ a cooperatively associated and rigidly interconnected radiation detector and radioactive source that are simultaneously rotated about an axially moving pipe, with the resulting variations in measured radiation intensity being used to derive corresponding wall-thickness measurements. In this manner, the circumference of the tubular member is inspected along a generally helical path, with the pitch or axial spacing between adjacent portions of the helical inspection path being determined by the relative rotational speed of the radiation inspection devices as well as the relative axial speed of the tubular member. It will be realized, of course, that such relative rotation can be practically obtained only by rotation of the inspection devices rather than by rotating the test piece inasmuch as the typical joint of piping or tubing is rarely dynamically balanced for efficient rotation about its axis.

Accordingly, in the ideal situation, the most thorough inspections are obtained by axially moving a given tube or pipe member slowly past the inspection unit while the radiation devices are rotated at a high speed around the test piece. This ideal situation has not been achieved heretofore, however, in commercially acceptable inspection units. In fact, if anything, practical considerations have previously limited inspection units of previously nature to particularly low rotative speeds which correspondingly make it necessary to translate the pipe joints past the inspection unit at undesirably low axial speeds which, in turn, result in inefficient inspection rates. For example, the marked sensitivity of typical radiation detectors to centrifugal forces has severely limited the rotational speeds at which these conventional thickness-measuring devices can be reliably operated. Furthermore, with a rotating radiation detector, all electrical connections thereto must be made through sliprings or the like which are inherent sources of undesirable interference and high noise levels in the signal circuits at even relatively low rotative speeds. Accordingly, those skilled in the art have long been aware that the maximum practical speed at which such radiation devices can be rotated is, at best, only a few hundred revolutions per minute. As a result, therefore, with inspection units of this nature, an exceptionally large percentage of the test piece is usually not inspected.

Although it might seem that these and other problems limiting the rotational speeds of the radiation devices could be simply overcome by merely inserting the detector into a tubular member being inspected, this approach has heretofore been believed to be wholly impractical for long lengths of pipe. In particular, since neither the spacing nor the alignment between a radioactive source an its associated detector can vary more than a very small fraction of an inch without greatly affecting the accuracy of the resulting measurements, no satisfactory arrangement has yet been devised for accurately positioning a radiation detector within long, axially moving pipe sections. Suitable supports can, of course, be arranged for rigidly positioning a detector within relatively short tubular members; but, it will be appreciated, however, that an entirely different problem is presented where the joints of piping or tubing to be inspected are of widely varying diameters and in lengths in the order of 30 to 40 feet and still must be moved at relatively high axial speeds. As a practical matter, therefore, it must be accepted that a radiation detector on the end of a long probe that is passed through an elongated joint of piping or tubing being inspected will inherently ride along the lower portion of the interior walls thereof.

The interior wall of such long pipe joints or tubing members do not, however, provide a sufficiently stable platform for accurately maintaining a radiation detector in alignment with and at a uniform spacing from its associated revolving radioactive source. For example, experience has shown that with even the best arrangements, a pipe joint being axially translated along a typical conveyor will continuously bounce or wobble so that the best alignment that can possibly be expected between the central axis of the outer wall of such a pipe joint and the rotational axis of a radioactive source rotating therearound is no better than about ±0.25 inch. The problem is even further compounded when it is realized that typical manufacturing tolerances for oilfield piping and tubing permit eccentricity deviations in the order of ±0.15 inch between the axial centerlines of their respective interior and exterior walls. Further compounded errors are also introduced where the pipe or tubing sections are either bent or are out of round.

When the source and detector are accurately positioned, an increase in the observed radiation measurement or count rate beyond a predetermined calibration level ordinarily indicates that the wall portion of piping or tubing under inspection is thin or flawed. In this situation, the count rate usually increases because radiation attenuation in reduced generally in proportion to the relative decrease in the mass of metal in the tubular member wall portion interposed between the radioactive source and the detector. These previously described irregularities in shapes as well as erratic motions and vibrations of the test piece will, however, unavoidably affect the spacing and alignment of the detector with its associated revolving radioactive source. As a result, upon such random deviations or erratic movements of the detector, the observed count rate will be decreased as the radiation-sensitive portion of the detector shifts even a small distance away from the most intense central portion of the radiation beam. Count rate changes caused by shifts of this nature will, therefore, produce either ambiguous results or incorrect indications of pipe thickness. Accordingly, the inner walls of typical oilfield piping and tubing moving through an inspection unit cannot at all be considered as being sufficiently true for reliably positioning a radiation detector in relation to its associated radioactive source to obtain accurate thickness measurements.

These practical limitations have, therefore, resulted in commercially acceptable inspection units of this nature heretofore having to employ a rotating fixture of some sort in which the radioactive source and radiation detector are rigidly mounted in predetermined positions for low-speed rotation about a swiftly moving pipe or tubular member. Thus, in addition to having to compromise the thoroughness of the inspection to achieve satisfactory inspection rates, these inspection units of the prior art also necessarily measured the combined thickness of two diametrically opposed wall portions of the test piece. This, of course, made it necessary with these prior inspection units to falsely assume either that the total measured thickness was always equally divided between the two opposed wall portions or that there was a known relation therebetween.

Accordingly, it is one object of the invention to provide new and improved apparatus for accurately measuring the true wall thickness of typical new or used elongated tubular members such as oilfield piping, tubing and joints of drill pipe, with these measurements being made at a large number of points so as to provide a reliable indication of the actual condition of the inspection member and without having to unduly limit the speeds at which the inspection may be conducted.

It is another object of the invention to provide a new and improved radiation system for inspecting tubular members in which random motions of the radiation detector will not affect the accuracy of the measurements.

If is a further object of the invention to provide a radiation focusing device for establishing a sharply defined radiation pattern on the portion of the tubular member being inspected.

It is still another object of the invention to provide an improved radiation system for inspecting tubular members in which random motion of the radiation detector does not degrade the quality of the measurement.

These and other objects of the present invention are attained by mounting a typical radiation detector on the free end of a fixed, but relatively flexible, elongated support that is generally aligned along a selected inspection axis. A source of radiation (Cobalt 60 or Cesium 137, for instance) is appropriately shielded within an annular rotatable member adapted for rotation at high speeds about the inspection axis. By mounting the source behind two or more inwardly directed, somewhat wedge-shaped or convergent slots cooperatively arranged in the rotating member, the radiation pattern established by the source is so sharply focused that, after passing through an interposed pipe wall, the total flux (i.e., the total radiation energy, in roentgens per unit time, for example) of the radiation pattern sensed by the radiation detector will remain substantially constant irrespective of even significant variations in either the spacing or alignment between the source and detector. These wedge-shaped focusing slots decrease in width as the distance from the source increases, with the convergent sidewalls of each slot being arranged to obturate any direct or straight-line radiation falling outside of a selected area on the inspection axis. By arranging these slots so that their respective radiation patterns are at least partially, if not substantially, superimposed at the inspection axis about which the source is rotated a much more sharply defined radiation pattern of limited size and substantial intensity is produced than the more diffuse patterns typically provided heretofore by the usual parallel-sided collimating slots.

By designing this well-defined area of high radiation intensity to be substantially less than the corresponding area of the detector's active portion, the detector can sway or bounce over a substantial range of distance from its intended position without shifting out of alignment with the source and focusing slots. In this way, random movements of the radiation detector in relation to the source produces a negligible effect on the detector count rate. Accordingly, as a joint of pipe is axially translated along the inspection axis in relation to the rapidly rotating radioactive source, the radiation detector confined within the pipe joint wall continuously provide accurate measurements of the true wall thickness along a generally helical inspection path along the pipe.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIG. 1 is a partial view of a vehicle in which a preferred embodiment of the present invention is mounted;

FIGS. 2 and 3 are elevational views in cross section of the testing apparatus of the present invention;

FIGS. 4-6 depict various details of a preferred arrangement in accordance with the present invention for mounting a sharply collimated radioactive source for high-speed rotation;

FIG. 7 depicts a preferred embodiment for arranging a typical radiation detector for passage through an axially moving pipe as the testing apparatus of the present invention is being operated; and FIG. 8 is a schematic diagram of an illustrative radiation-detection system suitable for use in connection with the present invention, including a wall-thickness recorder and a cross-sectional metal area recorder.

Turning now to FIG. 1, an elevational view is shown of thickness-measuring apparatus 10 arranged in accordance with the present invention and mounted within a vehicle 11. To illustrate a typical situation in which the new and improved apparatus 10 can be advantageously used, the thickness-measuring apparatus is axially aligned with other pipe-inspection apparatus 12 (such as shown in U.S. Pat. No. 3,287,632) for inspecting elongated sections of pipe for flaws. As is typical, pipe-translating means including a selectively powered conveyor 13 in the vehicle 11 and easily erected, portable ground-supported conveyors (such as those in U.S. Pat. No. 3,250,404 but not seen in the present drawings) at the opposite ends thereof are suitably arranged to selectively move pipe sections through the vehicle along a generally horizontal inspection axis. Accordingly, by successively moving pipe sections into and out of the vehicle 11, the apparatus 10 provides a thorough record of the wall thickness of each pipe as the flaw-inspection apparatus 12 concurrently inspects each pipe section for minute cracks and other defects.

As best seen in FIGS. 1 and 2, the preferred embodiment of the thickness-measuring apparatus 10 is basically comprised of radiation-detecting means 14 coaxially positioned within a horizontal, generally tubular, stationary housing 15 having an enlarged central cavity 16 in which is rotatably journaled an annular body 17 suitably arranged and dynamically balanced for high-speed rotation around the longitudinal axis 18 of the apparatus. As will subsequently be described in greater detail, sharply focused gamma-radiation means 19 are enclosed within an eccentrically located chamber 20 in the rotatable body 17 and appropriately oriented to emit a sharply defined inwardly directed beam of radiation that intersects the inspection axis 18 at about the position of the detecting means 14 (not seen in FIG. 2). Although the gamma-radiation means 19 are used in the exemplary embodiment of the apparatus 10, it is considered in the present invention that, as circumstances require, other types of radiation (e.g. neutron, alpha, beta or X-radiation) can also be used. Thus, upon rotation of the annular body 17 about its rotational axis 18, a beam of radiation will be progressively swept around the axis to continuously intersect the active portion of the detecting means 14. To maintain tubular members generally in coincidental alignment with the inspection axis 18 as they are axially translated through the apparatus 10, pipe-centralizing means are also provided such as first and second sets of circumferentially spaced pipe-supporting wheels 21 and 22 operatively disposed near each end of the housing 15.

To facilitate its fabrication as well as its assembly and disassembly, the housing 15 is preferably comprised of a number of individual massive members suitably arranged to be joined together as a unitary, well-shielded body. Accordingly, the central portion of the housing 15 is formed by transversely mounting annular end plates 23 and 24 on the opposite ends of a fairly thick, cylindrical annular ring 25, with the interior surfaces of these members defining the enlarged cavity 16. At least the end plate 24 is removably mounted on the outer housing ring 25 with, for example, suitable studs and nuts (not shown), so that access can be readily gained into the cavity 16. It will be appreciated, of course, that by making the central housing members 23-25 fairly massive, the housing 15 will serve as a substantial shield to guard against stray radiation that might otherwise escape from the rotatable body 17.

The housing 15 further includes generally tubular axial extensions 26 and 27 secured by flanges 28 and 29 to the end plates 23 and 24, respectively, and appropriately adapted for carrying the pipe-supporting wheels 21 and 22. As depicted in the drawings, these wheels 21 and 22 are respectively grouped in sets of three wheels each that are circumferentially spaced around their associated tubular extensions 26 and 27. In general, as best seen in FIG. 3, the centralizing wheels, such as 21, are individually journaled to roll longitudinally along a pipe moving axially through the housing 15, with each wheel having a plane of rotation including the central axis 18 and an outwardly directed radius therefrom. Thus, by equally spacing the wheels 21 and 22 around the circumference of their associated housing extensions 26 and 27 with the inwardly directed portion of each wheel projecting through an elongated slot, as at 30, in the housing extensions, a tubular member moving axially through the apparatus 10 will be rollingly supported by the periphery of each wheel. By grouping the pipe-engaging wheels 21 and 22 of each set in the illustrated manner and inwardly biasing the wheels with an adequate centralizing force, a tubular member moving through the wall-thickness measuring apparatus 10 will be maintained in substantial coaxial alignment with the housing 15.

Since the thickness-measuring apparatus 10 is preferably intended for inspecting tubular members of widely varying diameters, the pipe-engaging wheels 21 and 22 are adapted to move inwardly and outwardly in relation to the central axis 18, with the wheels in each set being operatively interconnected to move in unison as required to accommodate various pipe diameters. To allow the centralizing wheels 21, for example, to shift inwardly and outwardly in relation to the central axis 18, each wheel is journaled on a short shaft, as at 31, mounted on one end of a somewhat L-shaped crank arm, as at 32, that is pivotally mounted at its other end to the housing 15 for limited movement about a horizontal pivotal axis that is parallel to the central axis 18. Accordingly, inasmuch as each crank arm 32 needs to pivot through only a limited arc, the particular pipe-engaging wheel carried thereby will move along a short, generally arcuate path that is substantially a radial plane extending outwardly from the central axis 18. For convenience, it is preferred to fabricate each of the cranks 32 from spaced plate members 33 and 34 and pivotally connect each crank by a horizontal, longitudinally oriented shaft, as at 35, journaled between the housing flange 28 and an upright, as at 36, secured near the outer end of the housing extension 26.

As previously mentioned, the pipe-engaging wheels 21 and 22 of each set are adapted to move inwardly and outwardly in unison for centralizing various sizes of tubular members so that any member being inspected will always remain in substantially coincidental alignment with the central axis 18. In one manner of accomplishing this as well as to normally bias each of the pipe-engaging wheels inwardly, an outstanding annular plate, as at 37 and 38, is movably mounted near the outer end of each of the tubular extensions 26 and 27, respectively, for limited angular displacement thereon. To operatively couple the centralizing wheels 21 and 22 of one set to one another, a longitudinally directed pin, as at 39, is secured at a midportion of each crank 32 and extend toward its associated movable plate, as at 37; with the distal end of each of these pins being respectively disposed within an elongated slot or groove, as at 40, formed in a guide, as at 41, mounted on the circumference of the movable plate and equally spaced from one another.

Accordingly, as will be best understood by viewing FIG. 3, as each of the cranks 32 are pivoted inwardly or outwardly, their respective pins 39 will be correspondingly carried inwardly or outwardly in relation to the guide blocks 41. By appropriately inclining the grooves 40 in relation to the arcuate path to be traveled by each of the pins 39 therein, the camming action of any one of the pins against the walls of its confining guide groove 40 will angularly displace the movable plate 37 to a corresponding position. Thus, angular displacement of the movable plates 37 and 38 by any one of the pipe-engaging wheels 21 or 22 will be effective to correspondingly move all of the other centralizing wheels associated therewith to a similar position in relation to the central axis 18.

To normally urge the pipe-engaging wheels 21 and 22 inwardly as shown in FIGS. 2 and 3, one or more biasing means, as at 42, are eccentrically connected between each of the movable plates 37 and 38 and the housing 15 to urge the plates around to their respective positions where the cam pins 39 are positioned in their respective guide grooves 40 as corresponding to the inward positions of the wheels. Each of the biasing means 42 preferably includes a threaded rod, as at 43, that is pivotally connected, as at 44, at one end to its associated movable plate 37 and loosely extended through an opening, as at 45, in the outer end of one of the uprights 36 secured to the housing 15. A compression spring 46 around the outer portion of the threaded rod 43 is sufficiently compressed between an adjusting nut 47 on the rod and the housing upright 36 to bias the movable plate 37 toward its illustrated position. If desired, a protective enclosure 48 can be disposed around the spring 46 and adjusting nut 45.

As best seen in FIG. 2, the annular body 17 is concentrically supported in an upright position within the central housing cavity 16 and journaled to the housing 15 by longitudinally spaced bearings 49 and 50 in the end plates 23 and 24, respectively, carrying axially aligned tubular shafts 51 and 52 projecting from opposite ends of the rotatable body. In one manner of rotating the annular body 17 at high speeds about its rotational axis 18, the axle or shaft 52 is extended beyond its associated bearing 50 and coupled to driving means, such as a motor 53 mounted outside of the housing 15, by a suitable power transmission such as a typical chain or belt 54 operatively interconnecting a pulley 55 on the tubular axle 52 and a pulley 56 on the motor. To further guard against scattered radiation, a massive annular spacer 57 sized to completely enclose the pulley 55 and having an outwardly converging opening 58 through which the belt 54 passes is interposed between the tubular extension 27 and end plate 24. In the preferred embodiment of the inspection apparatus 10, the tubular extension 27 and spacer 57 are detachably mounted on the end plate 24 to provide access to an inspection port 59 in the end plate that is normally covered by a complementary closure 60.

As previously mentioned, the annular body 17 is adapted to be rotated at high speeds to carry the eccentrically located radiation means 19 about the rotational axis 18. Thus, to absorb the radiation in the beam from the radiation means 19, a target shield 60 of a suitable shielding material such as tungsten is secured in the rotatable body 17 diametrically opposite from the radiation means. As a further precaution against backscattering, an outwardly converging, generally frustoconical recess 61 is formed in the inner wall of the rotatable body immediately around the target shield 60.

It will be appreciated, of course, that high-speed rotation of the annular body 17 and the radiation means 19 and target shield 60 thereon will require that the entire rotating mass be carefully balanced dynamically for rotation about the inspection axis 18. Although the body 17 could be circular, it is preferred to shape the rotatable body so as to reduce the mass of metal at those portions of the body immediately adjacent to the radiation means 19. Accordingly, as best seen in FIG. 4, the rotatable body 17 is preferably a large, somewhat sectorially shaped, massive shielding member of uniform thickness; with the radiation means 19 including the apicial portion of the body and the target shield 60 being centered in the opposite wider portion thereof to provide as much shielding mass as possible on each side of the target. It will be recognized, of course, that the particular exterior shape and distribution of masses in the rotatable body 17 will be governed by the usual principles of dynamic balancing once the necessary shielding requirements of the target 60 and radiation means 19 are established.

The radiation means 19 of the present invention (as best seen in FIGS. 4–6) include the apicial portion of the sectorially shaped rotatable body 17 which serves as a radiation shield. As depicted in the drawings, the radiation means 19 are further comprised of a suitable radiation source 62 (such as Cobalt 60, Cesium 137, or other acceptable sources of gamma radiation that is substantially enclosed in a suitable source cup 63 having an opening 64 on one side thereof. The source cup 63 is operatively disposed within an eccentrically located longitudinal chamber 65 extending part way into the rotatable body 17. A removable closure member 66 (FIG. 2) is normally fitted into the open end of the source chamber 65 to enclose the source cup 63. By appropriately locating the access port 59 in the end plate 24, the rotatable body 17 can be turned so as to bring the longitudinal source chamber 65 into alignment with the access opening to facilitate routine inspection and servicing of the radioactive source 62.

The radiation means 19 of the present invention further include particularly arranged focusing means shown generally at 67. As best seen in FIGS. 5 and 6, these focusing means 67 preferably comprise a block 68 formed of steel, tungsten, lead or some other suitable radiation-attenuating or shielding material that is mounted in a radially directed complementary chamber 69 formed in the rotatably body 17 just ahead of the source chamber 65 and diametrically opposite from the target shield 60. Although a selectively movable shutter assembly (as shown generally at 116 in the aforementioned parent application) can be successfully provided, it has been found that the overall shielding of the apparatus 10 is sufficient to not require this feature. Accordingly, a radially directed radiation passage 70 is appropriately located in the shield block 68 to define a diametrical radiation axis 71 between the source 62 and target shield 60 that is perpendicular to and intersects a selected location on the inspection axis 18.

Of particular significance, it should be noted that in marked contrast to the typical collimating slots with parallel sides that are characteristic of the prior art, the radiation passage 70 has a generally rectangular transverse cross section in relation to the radiation axis 71, with the opposed lateral sidewalls 72 and 73 of the passage being convergent and respectively lying in radial planes preferably converging at a common intersection with the inspection axis 18 and its opposed transverse sidewalls 74 and 75 being generally parallel. Stated another way, as best seen in FIGS. 2 and 6, the transverse sidewalls 74 and 75 respectively lie in spaced parallel planes perpendicular to the plane of these drawings and intersecting the inspection axis 18 on each side of the intersection therewith of the radiation axis 71. On the other hand, as best seen in FIG. 5, the lateral sidewalls 72 and 73 of the radiation passage 70 respectively lie in converging radial planes uniformly spaced from the radiation axis 71 and perpendicular to the sidewalls 74 and 75.

In addition to forming the convergent radiation passage 70 as described, the radiation-focusing effects thereof are further enhanced by dividing the radiation passage into two or more separate inwardly converging focusing slots. In the preferred embodiment of the present invention, these separate slots are formed by dividing the shield block 68 along its length into identical halves and separating these two halves with a longitudinal barrier 76 which divides the radiation passage 70. Then, as best illustrated in FIG. 5, each half of the radiation passage 70 is further divided into inwardly converging slots, as at 77–79, by means of relatively thin elongated tapered partitions, as at 80 and 81, of steel or the like that are secured along the radiation passage 70 between the barrier 76 and parallel sidewalls 74 and 75 and uniformly spaced from one another and the converging sidewalls 72 and 83. It will be appreciated, therefore, that by positioning the fins or partitions 80 and 81 with their thinner ends at the outer end of the radiation passage 70 (i.e., the end of the passage nearest to the source 62) and their thicker ends at the inner end of the radiation passage, each of the focusing slots 77–79 will be inwardly convergent and have a separate radiation axis intersecting the inspection axis 18.

Accordingly, it will be seen from FIG. 5 that each of the fins 80 and 81 are so formed that they will obturate any direct or straight-line radiation from the source 62 that will fall outside of an area of a selected size lying on the inspection axis 18. Thus, each of the associated outer focusing slots 77 and 79 are cooperatively arranged so that their respective radiation patterns are substantially identical and are completely superimposed with one another on the inspection axis 18. Similarly, each of the intermediate focusing slots 78 are so arranged that their radiation patterns are also superimposed on the axis 18 with those from their associated outer slots 77 and 79, with the radiation pattern from each intermediate slot preferably being of a slightly smaller size and centrally aligned within the superimposed patterns of their respectively associated outer slots.

Taking one of the focusing slots 77, for example, all straight-line radiation from the source 62 that passes through this slot must be within the boundaries shown at "a" and "b" in FIG. 5. Although the inspection axis 18 is beyond the range of view of FIG. 5, the boundary lines "a" and "b" intersect the inspection axis at an equal distance above and below the intersection of the radiation axis 71 with the inspection axis. Similarly, all straight-line radiation passing through each of the slots 79 must also be within the boundaries "c" and "d." By making the associated slots 77 and 79 of equal size and respectively directing them where their individual axes intersect at the intersection of the axes 18 and 71, the radiation patterns from each of the associated outer slots will be identical and completely superimposed at this intersection. The central or intermediate slots 78 are respectively sized so that their own radiation patterns at the axis 18 will at least be no larger and preferably slightly smaller than the superimposed patterns of their associated outer slots 77 and 79. Thus, although the radiation intensity at the inspection axis 18 will be substantial, the combined radiation pattern of all of the slots 77–79 will be sharply defined and be of a predetermined size.

In the exemplary arrangement of the inspection apparatus 10 illustrated, the overall length of the radiation passage 70 is about 3 inches. Each of the fins or thin tapered partitions 80 and 81 have an average thickness of only about 0.05 inches and are so arranged in the radiation passage 70 that the width and height of the outer end (nearest the source 62) of each slot 77–79 is about 0.2 inch. The width of each converging slot 77–79 (i.e., between the opposite faces of the barrier 76 and the respectively associated parallel sidewall 74 or 75) remains uniform for the full length of the radiation passage 70. On the other hand, by virtue of the cooperative arrangement of the converging sidewalls 72 and 73 and the thin tapered partitions 80 and 81 within the radiation passage 70, the inner end or aperture of each of the slots 77–79 has a height of only about 0.11 inch. With this arrangement, the inspection axis 18 was 9½ inches from the centerline of the source 62 and the combined radiation pattern from all six slots 77–79 when measured at the inspection axis was only about one-half ×1 inch, with the 1-inch dimension being along the axis 18.

Accordingly, it has been found that the cooperative disposition of the thin fins 80 and 81 in relation to the passage 70 produces an overall radiation beam that has an unusually sharp focus. By way of possible explanation of the underlying theory for deriving such a sharply focused beam of radiation, it will be appreciated, of course, that radiation from the source 62 that is accurately aligned with the radial or longitudinal axis of any of the converging slots 77–79 will be relatively unaffected by the presence of the fins 80 and 81. On the other hand, any improperly directed radiation from the source 62 that is slightly out of alignment with the longitudinal axis of any of the convergent slots 77–79 will strike the surface of one or more of the partitions 80 and 81, the barrier 76, or one of the passage walls 72–75 at an acute angle and be either scattered in the proper direction or absorbed.

With respect to the fins 80 and 81, although they are relatively thin, it will be recognized that, in accordance with the invention, they will be highly effective to significantly attenuate any misdirected radiation. In this regard, in order to focus the gamma radiation within an area less than that which is bounded by the corresponding detector area, it is necessary to either scatter the radiation emitted from the source 62 in the proper direction or else absorb any improperly directed radiation. Ordinarily, gamma-radiation absorption is a function of the exponential relation:

$$I = I_o e^{-\mu x}$$

where "$I_o$" is the gamma intensity as it strikes the absorber; "is the gamma-radiation intensity at a distance "$x$" from the point where "$I_o$" is measured; and "$\mu$" is the linear absorption coefficient for the absorber in question. Superficially, it appears that a fin of thickness "$t$" FIG. 5) would exert a negligible influence on the radiation emitted from the source 62. Most of the gamma radiation that is likely to produce a more diffuse radiation pattern, however, strikes the fins 80 and 81 at an acute angle. The effective radiation-attenuating depth "*l*" (FIG. 5) of the fins 80 and 81 is, in fact, substantially greater than the thickness "*t*" inasmuch as the radiation must traverse the fin in a generally radial direction. Thus, the thin partition means 80 and 81 produce a sharp pattern by absorbing or scattering back the improperly directed gamma rays. Thus, the present invention produces a well-defined pattern or beam of radiation along the radiation axis 71 which is much more sharply focused than has heretofore been possible inasmuch as the obturating partition means, as at 80 and 81, absorb, redirect or scatter back improperly directed gamma rays from the source 62 with an efficiency far in excess of that which is apparent from the small mass of shielding mass present in the partition means.

Referring again to FIG. 1, it will be appreciated that the radiation-detecting means 14 are adapted to remain substantially in position at the intersection of the radiation axis 71 and inspection axis 18. The accomplish this with long sections of pipe and the like (as at 82) as they are advanced along the inspection axis 18, as seen in FIG. 7, the radiation-detecting means 14 include a radiation detector 83 (FIG. 8), as for example an ionization chamber or scintillation detector, mounted in a suitable enclosed protective housing 84 that is carried on the free end of a long tubular probe 85 that is generally aligned with the inspection axis 18 and of sufficient length to maintain the radiation detector at the intersection of the radiation axis 71 (FIG. 5) and the inspection axis. Electrical conductors 86 connecting the detector 83 are conveniently passed through the probe 85.

Thus, with the inspection apparatus 10 arranged as described, a pipe, as at 82, is horizontally positioned on a ground-supported conveyor just to the left of the range of view of FIG. 1 and axially aligned with the inspection axis 18. Then as the pipe 82 is advanced onto the conveyor 13 in the vehicle 11 (from left to right in FIG. 1), the detector 83 will enter the leading end of the pipe and ride along the lower portion of the internal pipe wall. Accordingly, as the source 62 is rotated about the inspection axis 18 and the pipe 82 advanced through the inspection apparatus 10, the sharply focused beam of radiation will continuously sweep around the detector 83 to inspect the pipe along a generally helical path along its full length. Once the trailing end of the pipe 82 has passed the detector 83, the conveyor 13 is reversed to return the pipe (from right to left in FIG. 1) to the conveyor outside of the vehicle 11.

It will be appreciated, therefore, that the probe 85 must be somewhat longer than the length of whatever pipe sections are to inspected. Moreover, although a special probe can, of course, be arranged just for supporting the detector 83, to more efficiently combine the apparatus 10 of the present invention with the flaw-detection apparatus 12, it is preferred to mount the detector on the outermost end of the probe 85 and arrange the remainder of the probe as shown generally at "C" in U.S. Pat. No. 3,287,632 so that the probe will also be usable as the axial conducting member for circumferentially magnetizing the pipe 82.

In any event, as best seen in FIG. 7, in one manner of adapting the detector 83 for movement along the lower internal wall of the pipe 82 as it is axially advanced or retracted in relation to the inspection apparatus 10, the housing 84 includes a central tubular portion 87 of Nylon, or the like, that will not significantly attenuate incident radiation and one or more centralizers as at 88 and 89. In the embodiment illustrated, the centralizers 88 and 89 are located on opposite ends of the housing 84 and comprised of a plurality of retractable wear members or shoes, as at 90 and 91, spaced circumferentially about the detector housing. To allow the shoes 90 and 91 to move inwardly and outwardly in conformance with the internal diameter of a tubular member being inspected, each wear shoe is detachably mounted on the free end of a leaf spring or yieldable finger, as at 92 and 93, secured at its other end to the housing 84. By allowing the wear members 90 and 91 to move inwardly and outwardly through appropriately sized openings 94 and 95 in the housing 84 as the fingers 90 flex, the detector 83 will be maintained in general alignment with the inspection axis 18. As a matter of convenience, the shoes 90 and 91 are adapted to be readily exchanged with other shoes (not shown) of greater or lesser heights so that the inspection apparatus 10 will be effective for inspecting a wide range of various sizes of tubular members.

In the embodiment illustrated, the detector 83 has a diameter of about 2 inches and a length of about 5 inches to provide a radiation-sensitive or active volume of perhaps 15 cubic inches. With the embodiment of the focusing means 67 as already described, the transverse area of maximum radiation intensity intersecting the detector centerline by the new and improved focusing characteristics of the slots 77–79 in the shield block 68, however, is about 1 inch in a lateral or transverse direction and about 2 inches along the detector centerline or inspection axis 18 to provide a sharply defined area of maximum radiation intensity of about 2 square inches. Accordingly the detector 83 can sway as much as one-half inch to either side of the center inspection axis 18 without causing the active volume to shift out of alignment with the radiation pattern established by the source 62. This feature of the invention enables the detector 83 to move through a range of distances due to motion or irregularities in the shape of the pipe 82 without appreciably affecting the count rate registered by the detector.

A further radiation-detection system typically may comprise a scintillation detector. Under gamma ray irradiation, for instance, a scintillator, as for example a crystal of thallium-activated sodium iodide, produces a brief flash of light in response to each attenuated gamma ray. These flashes of light then are registered by a photoelectric substance that emits electrons when stimulated by light quanta. The electrons, when properly processed, establish a signal that indicates the gamma ray activity observed through the system. Because scintillators have a much higher gamma ray detection efficiency than ion chambers, the activity of the source 62 can be reduced to a range, for instance, of 2 to 5 curies of Cesium 137.

Turning now to FIG. 8, a somewhat schematic representation is shown of a preferred embodiment of electronic circuitry 96 for converting the output signal of the radiation detector 83 to a meaningful record. To accomplish this, the measured count rate or output signal of the detector 83 is coupled by way of the conductors 86 and a suitable amplifier 97 to an indicator, such as a recorder 98, that is suitably calibrated for progressively providing a continuous first indication representative of the wall thickness of a tubular member passing through the inspection apparatus 10. As an additional feature, the circuitry 96 also includes a time-averaging feature, the circuitry 96 also includes a time-averaging circuit 99 appropriately tuned to average the output of the detector 83 for each revolution of source 62 to provide a second indication, as on a typical recorder 100, representative of the transverse cross-sectional metal area through that portion of the tubular member scanned in that revolution. In this manner, by driving the recorders 98 and 100 at speeds related to the axial speed of the pipe section 82 past the apparatus 10, continuous meaningful records will be obtained of the actual metal thicknesses along the generally helical inspection path around the pipe as well as of successive transverse cross-sectional metal areas along the length of the pipe. The circuitry 96 further includes alarm indicators, as at 101 and 102, coupled to the recorders 98 and 100 and adapted for warning the operator of the apparatus 10 that the respective thickness and area measurements are less than some selected minimum value.

Accordingly, it will be appreciated that the new and improved apparatus 10 of the present invention provides a very accurate and effective inspection of elongated tubular members such as oilfield piping and tubing. By mounting only the radioactive source 62 in the rotating portion of the apparatus, the inspection apparatus 10 of the invention can be operated at significantly higher rotational speeds than has been possible heretofore for inspecting tubular members at a substantial number of circumferentially located points along their length without unduly affecting the speed at which the tubular members can be inspected. Moreover, by virtue of the new and improved focusing means 67, the radiation beam from the source 62 is so closely focused that even substantial random movements of the radiation detector 83 within the tubular member being inspected will have no significant effect upon the accuracy of the measurements. It will be appreciated, therefore, that the present invention will accurately measure the wall thickness of typical new or used elongated tubular members in such a manner as to provide a reliable indication of their actual condition and without unduly limiting the speed of such inspections.

It will, or course, be understood that the focusing principles of the present invention are of value wherever a sharply defined radiation pattern is desired. Thus, only by way of illustration, these principles could well be adapted for radiotherapeutical treatment, sterilization of medical instruments, inspection techniques or processing of various articles requiring concentrated beams of radiation, as well as other industrial applications.

While a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A radiation-focusing device comprising: a mass of gamma radiation-attenuating material having a first side adapted to face a source of gamma radiation and a second side spatially disposed from said first side, said mass having a plurality of focusing slots therein extending between said sides of said mass, each of said focusing slots converging through at least a portion thereof in relation to its respective length with increasing separation from said first side, each of said focusing slots being formed about a longitudinal axis, with said longitudinal axes being oriented so as to converge at a common intersection ahead of said second side, there being first and second groups of said focusing slots, said longitudinal axes of said focusing slots in each of said groups lying in a common longitudinal plane and converging at a common intersection ahead of said second side, said common longitudinal planes being substantially parallel so as to space said common intersections apart from one another.

2. Apparatus adapted for inspecting elongated tubular members and comprising: means adapted to support an elongated tubular member for axial movement along a selected axis; a body of radiation-attenuating material adapted for rotation about an elongated tubular member moving along said axis of movement and including a chamber therein spatially disposed from said axis of movement; a source of radiation in said body chamber; radiation-focusing means on said rotatable body including; a device comprising a mass of radiation-attenuating material having a first side adapted to face a source of radiation and a second side spatially disposed from said first side, said mass having a plurality of focusing slots therein extending between said sides of said mass, each of said focusing slots converging through at least a portion thereof in relation to its respective length with increasing separation from said first side, each of said focusing slots being formed about a longitudinal axis, with said longitudinal axes being oriented so as to converge at a common intersection ahead of said second side, there being first and second groups of said focusing slots, said longitudinal axes of said focusing slots in each of said groups lying in a common longitudinal plane and converging at a common intersection ahead of said second side, said common longitudinal planes being substantially parallel so as to space said common intersections apart from one another to produce an inwardly directed narrowly focused radiation beam of a predetermined cross-sectional area at a selected location; a radiation detector adapted for reception in an elongated tubular member moving along said axis of movement and including a radiation-sensitive portion having an effective area greater than said predetermined beam area; and means adapted to retain said radiation detector at about said selected location within an elongated tubular member moving along said axis of movement.

3. The apparatus of claim 2 wherein said rotatable body includes an annular member disposed about said axis of movement and having a coaxial opening therein sized to pass elongated tubular members moving along said axis of movement, and further including: means supporting said rotatable body for rotation about said axis of movement; and means selectively operable for rotating said rotatable body to progressively revolve said radiation beam about an elongated tubular member moving along said axis of movement.

4. The apparatus of claim 3 wherein the plane of revolution of said radiation beam is generally perpendicular to said axis of movement.

5. The apparatus of claim 4 wherein said body-supporting means include a housing enclosing said rotatable body; first and second tubular axles mounted on opposite sides of said annular member and concentric with said coaxial opening and axis of movement; and first and second bearings operatively journaling said axles to said housing.

6. The apparatus of claim 5 wherein said openings of said passages are on one side of said coaxial opening through said annular member, and further including: a shield member of a radiation-attenuating material on said annular member and diametrically opposed on the other side of said coaxial opening from said openings of said passages.

7. The apparatus of claim 6 further including: centralizing means on said housing and selectively operable for maintaining an elongated tubular member moving along said axis of movement in substantial coaxial alignment therewith and within said coaxial opening.

* * * * *